Patented Apr. 26, 1938

2,115,088

UNITED STATES PATENT OFFICE 2,115,088

ACID PHOSPHATIDE EMULSION

Albert Schwieger, Hamburg, Germany, assignor to American Lecithin Company, Cleveland, Ohio, a corporation of Ohio No Drawing. Application September 16, 1936, Serial No. 101,133. In Germany October 28, 1935

7 Claims. (Cl. 99—15)

This invention is concerned with a process for the preparation of bread and other baked stuff, in which lecithin is added to improve the baking properties thereof, particularly in the form of a watery acid emulsion. In particular, it refers to a new type of lecithin acid emulsion and to the use thereof in the manufacture of acid-containing baked products.

Lactic acid has heretofore been added to baked stuffs, especially for the preparation of rye breads, to replace the unreliable leavens ordinarily used and to impart to the bread the property of keeping its freshness. Lecithin, likewise, has been added to baking mixtures to improve the baking qualities, but the two have never been used together, because of the fact that lecithin is ordinarily precipitated from watery emulsions by water soluble acids, and it has been the opinion of the art that such a joint use would result in the precipitation of the lecithin and the elimination of its desirable properties.

I have found, however, that contrary to the general belief, lactic acid and similar lower water soluble aliphatic acids do not possess this property of precipitating lecithin emulsions, but on the contrary, form very stable watery emulsions with lecithin, which do not separate on long standing, as long as the water content of the emulsions does not rise substantially above 35%. Thickening agents may be added to these emulsions in order to render the more or less liquid emulsions of the higher water content of rather pasty consistency.

According to a preferred form of my invention, a watery phosphatide lactic acid emulsion is used, for example, approximately equal parts of lecithin lactic acid in water, the phosphatide being preferably made fluid by warming, mixed with lactic acid and finally emulsified with water. This mixture can be thickened by the use of an ordinary thickening agent, such as a starch and the resultant leaven added to a rye bread dough.

Thus 100 kilograms of soya lecithin, containing about 75% soya phosphatide and about 25% soya oil, were warmed until the mass was melted and 100 kilograms of 80% lactic acid were added with stirring. This produced 200 kilograms of a very stable emulsion containing a rather small amount of water.

To the emulsion obtained in the manner described, 100 kilograms of water were added. The mixture was then stirred. The emulsion thus obtained was sufficiently stable and still very thin.

The invention can also be executed in the following manner:

Nine kilograms of wheat starch were swelled with 16 kilograms of warm water into a paste to which 75 kilograms of boiling water were added, thus producing a starchy paste. This paste can be added to the emulsion of soya lecithin and lactic acid, the production of which was described above. By this means an emulsion is obtained of pasty consistency which is also very stable.

Example

A rye bread can be produced according to the invention in the following manner:

66 kilograms of rye flour
34 kilograms of wheat flour
55.5 kilograms of water at 29° C.
1 kilogram of yeast
1.5 kilograms of salt
0.75 kilogram of an emulsion of lecithin and lactic acid produced in the manner described above are mixed into a dough in the usual manner. The dough is left over to stand for about 45 minutes at a temperature of 27° C. The dough is then worked in the usual manner and loaves of 1.370 kilograms of weight are made. The loaves are then left for fermentation in a room in which the temperature is kept at 45 to 50° C. During this time once or twice a small quantity of steam is blown in. Then the loaves are baked at a temperature of about 250° C. in an ordinary oven for about 35 minutes.

The finished loaves are of about 1.250 kilograms of weight and show a particularly bright appearance.

Instead of soya lecithin other vegetable phosphatides can be used or phosphatides of similar origin. I have made similar emulsions by replacing the lactic acids of the examples with other lower aliphatic acids, for example, acetic and tartaric acids.

Baked goods made according to the above invention by incorporating therein these watery emulsions show a uniform porous structure, a considerable volume increase, a good crust formation and good retention of freshness. Rye breads baked by this method show a marked reduction of the undesirable tendency towards souring, noted with conventional prior art leavens.

I claim:

1. A stable watery emulsion of a phosphatide and a water soluble lower aliphatic acid characterized by a water content of not substantially over 35%.

2. A stable watery emulsion of soya lecithin and a water soluble lower aliphatic acid characterized by a water content of not substantially over 35%.

3. A stable watery emulsion of phosphatide and a water soluble lower aliphatic acid, in which the water content is not substantially over 35%, said phosphatide and acid being present in approximately equal parts.

4. The emulsion of claim 3 in which the phosphatide is soya lecithin.

5. The emulsion of claim 3 in which the phosphatide is soya lecithin and the acid is lactic acid.

6. A stable watery emulsion of a phosphatide and an acid selected from the class consisting of lactic, acetic and tartaric acids, characterized by a water content of not substantially over 35%.

7. A stable watery emulsion of soya lecithin and lactic acid, characterized by a water content of not substantially over 35%.

ALBERT SCHWIEGER.